United States Patent
Liao

(10) Patent No.: US 7,426,574 B2
(45) Date of Patent: Sep. 16, 2008

(54) TECHNIQUE FOR INTERCEPTING DATA IN A PEER-TO-PEER NETWORK

(75) Inventor: En-Yi Liao, Santa Clara, CA (US)

(73) Assignee: Trend Micro Incorporated, Tokyo (JP)

( * ) Notice: Subject to any disclaimer, the term of this patent is extended or adjusted under 35 U.S.C. 154(b) by 640 days.

(21) Appl. No.: 10/737,389

(22) Filed: Dec. 16, 2003

(65) Prior Publication Data

US 2005/0144288 A1 Jun. 30, 2005

(51) Int. Cl.
*G06F 15/173* (2006.01)
*G06F 15/16* (2006.01)

(52) U.S. Cl. .................... 709/238; 709/201
(58) Field of Classification Search ........... 709/201, 709/238
See application file for complete search history.

(56) References Cited

U.S. PATENT DOCUMENTS

| | | |
|---|---|---|
| 5,444,850 A | 8/1995 | Chang |
| 5,623,600 A | 4/1997 | Ji et al. |
| 5,680,547 A | 10/1997 | Chang |
| 5,781,550 A * | 7/1998 | Templin et al. ............ 370/401 |
| 5,889,943 A | 3/1999 | Ji et al. |
| 5,951,698 A | 9/1999 | Chen et al. |
| 5,960,170 A | 9/1999 | Chen et al. |
| 5,983,348 A | 11/1999 | Ji |
| 6,061,796 A * | 5/2000 | Chen et al. ................. 713/201 |
| 6,076,114 A | 6/2000 | Wesley |
| 6,101,549 A * | 8/2000 | Baugher et al. ............ 709/238 |
| 6,119,165 A | 9/2000 | Li et al. |
| 6,272,641 B1 | 8/2001 | Ji |
| 6,393,487 B2 | 5/2002 | Boucher et al. |
| 6,519,263 B1 | 2/2003 | Huth |
| 6,587,874 B1 | 7/2003 | Golla et al. |
| 6,629,100 B2 * | 9/2003 | Morris et al. ................ 707/10 |
| 6,654,373 B1 | 11/2003 | Maher, III et al. |
| 6,678,734 B1 | 1/2004 | Haatainen et al. |
| 6,779,004 B1 | 8/2004 | Zintel |
| 6,789,117 B1 * | 9/2004 | Joiner et al. ................ 709/224 |
| 6,892,230 B1 | 5/2005 | Gu et al. |
| 7,028,335 B1 | 4/2006 | Borella et al. |
| 7,123,613 B1 * | 10/2006 | Chawla et al. ............. 370/389 |
| 2002/0147780 A1 | 10/2002 | Liu et al. |
| 2002/0156917 A1 * | 10/2002 | Nye ............................ 709/238 |
| 2002/0178381 A1 | 11/2002 | Lee et al. |
| 2002/0198930 A1 * | 12/2002 | Jones et al. ................. 709/201 |
| 2003/0021280 A1 | 1/2003 | Makinson et al. |
| 2003/0028585 A1 * | 2/2003 | Yeager et al. .............. 709/201 |
| 2003/0055962 A1 | 3/2003 | Freund et al. |
| 2003/0212710 A1 * | 11/2003 | Guy ........................ 707/104.1 |
| 2004/0088646 A1 * | 5/2004 | Yeager et al. .............. 715/500 |
| 2004/0158741 A1 * | 8/2004 | Schneider .................. 713/201 |

* cited by examiner

*Primary Examiner*—William C. Vaughn, Jr.
*Assistant Examiner*—Ranodhi N Serrao
(74) *Attorney, Agent, or Firm*—Okamoto & Benedicto LLP

(57) ABSTRACT

In one embodiment, in a peer-to-peer network, data intended to be transferred directly from a first peer node to a second peer node are first redirected to an interception node. In the interception node, the data may be processed prior to being forwarded to the second peer node. The data may be scanned for virus detection and removal, for example.

5 Claims, 4 Drawing Sheets

TECHNIQUE FOR INTERCEPTING DATA IN A PEER-TO-PEER NETWORK

BACKGROUND OF THE INVENTION

1. Field of the Invention

The present invention relates generally to computer networks, and more particularly but not exclusively to methods and systems for communicating in a peer-to-peer network.

2. Description of the Background Art

Peer-to-peer ("P2P") is a type of computer network that allows one computer to directly communicate with another computer with little or no assistance from a central server. P2P networks are widely employed in both personal and business environments to transfer data, such as files for music, word processing, spreadsheet, video, and so on. Although P2P networks may have varying implementation details, most P2P networks allow files to be transferred directly from one computer to another. P2P networks may be implemented on the Internet. On the Internet, a P2P network typically requires the services of a P2P server to facilitate the establishment of direct communication channels between computers belonging to the P2P network.

FIG. 1 shows a schematic diagram of a conventional P2P network 140. P2P network 140, which may be on the Internet, includes a P2P server 120 and a plurality of peer nodes 110 (i.e., 110-1, 110-2, ...). A peer node 110 may communicate with P2P server 120 over a communication channel 141 (i.e., 141-1, 141-2) and with another peer node 110 over a communication channel 143.

A peer node 110 may be a personal computer, for example. A peer node 110 may include a P2P module 112(112-1, 112-2, ...) and one or more files 113(113-1, 113-2, ...). A P2P module 112 may comprise computer-readable program code (i.e., software) for communicating with a P2P server 120 and for directly communicating with another peer node 110.

A P2P server 120 may be a computer server that has information on the whereabouts of peer nodes 110 that belong to the P2P network. Peer nodes 110 that belong to the P2P network are also referred to as members of the "P2P community." A P2P server 120 may include a presence map 122 and a P2P manager 123. A presence map 122 may be a table or data structure containing presence information of peer nodes 110 belonging to the P2P network. Presence information may include the location information of a peer node 110, such as its IP address and port number. A P2P manager 123 may comprise computer-readable program code for providing a registrar function and a proxy function. The registrar function of P2P manager 123 allows peer nodes 110 to register its address with P2P server 120. For example, peer node 110-1 may register with P2P server 120 by providing its address. In P2P server 120, in response to the registration, P2P manager 123 may enter the address of peer node 110-1 in presence map 122. The proxy function of P2P manager 123 is employed to proxy session information between peer nodes 110. For example, invitations and acknowledgements for direct data transfers between peer nodes may be transmitted through P2P server 120 using the proxy function of P2P manager 123. Once communication has been established between peer nodes 110, the peer nodes 110 may directly exchange data without going through P2P server 120.

One problem with P2P networks is that direct data exchange between two peer nodes may facilitate the transfer of computer viruses. Unless every peer node in the P2P network has up-to-date antivirus software, one infected peer node may spread a virus to other peer nodes. Another problem with P2P networks is the lack of control on the data being transferred between nodes. While this might not be a concern among personal users, some businesses or organizations may have requirements on the kind of data that may be exchanged over the P2P network.

SUMMARY

In one embodiment, in a peer-to-peer network, data intended to be transferred directly from a first peer node to a second peer node are first redirected to an interception node. In the interception node, the data may be processed prior to being forwarded to the second peer node. The data may be scanned for virus detection and removal, for example.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 2:
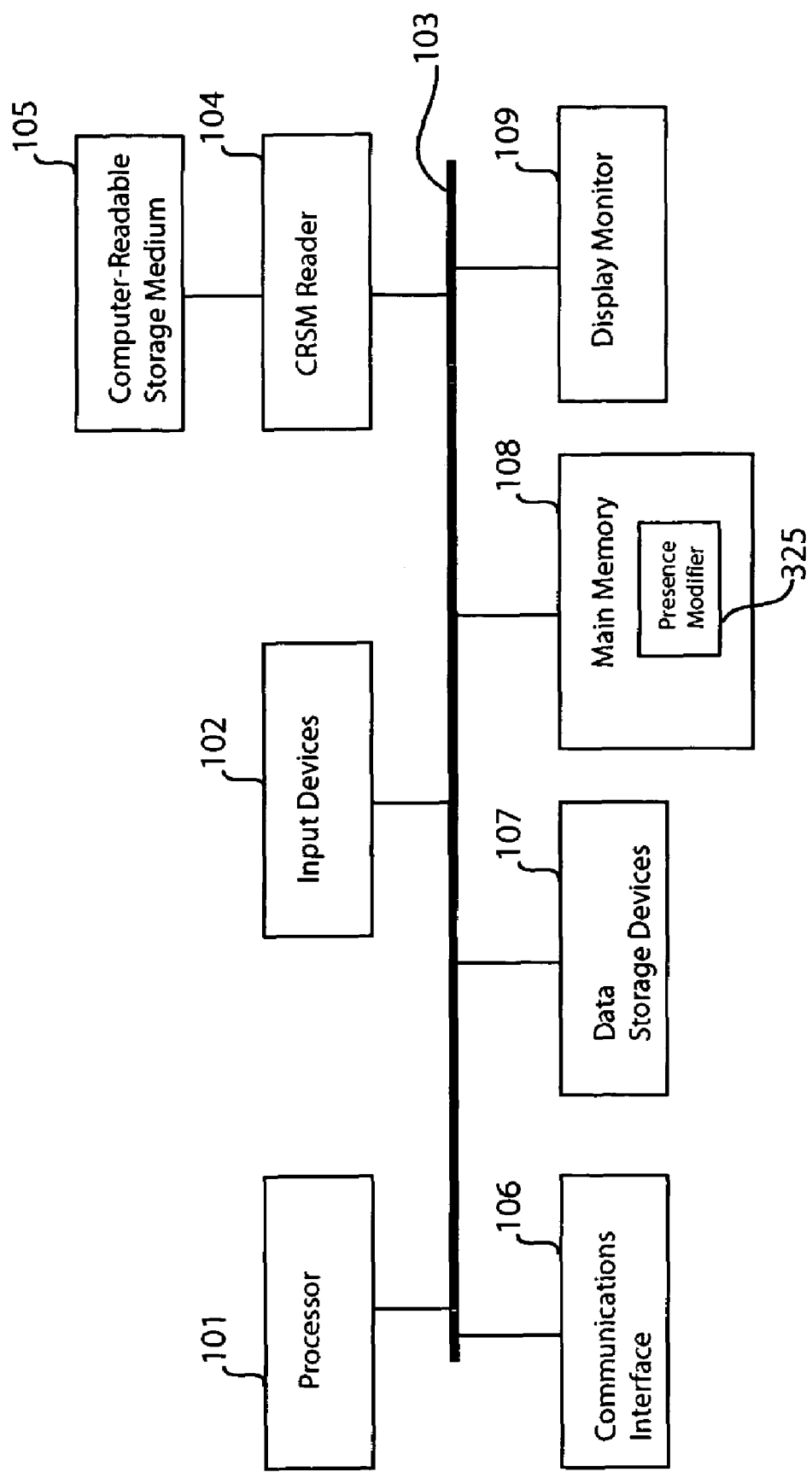
FIG. 2 shows a schematic diagram of an example computer that may be used in embodiments of the present invention.

Referring now to FIG. 2, there is shown a schematic diagram of an example computer that may be used in embodiments of the present invention. Depending on its configuration, the computer shown in the example of FIG. 2 may be employed as a personal computer or a server computer, for example. The computer of FIG. 2 may have less or more components to meet the needs of a particular application. As shown in FIG. 2, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. In the example of FIG. 2, main memory 108 may be configured to include a presence modifier 325, which is further discussed below. A presence modifier 325 may be executed by processor 101.

Figure 1:
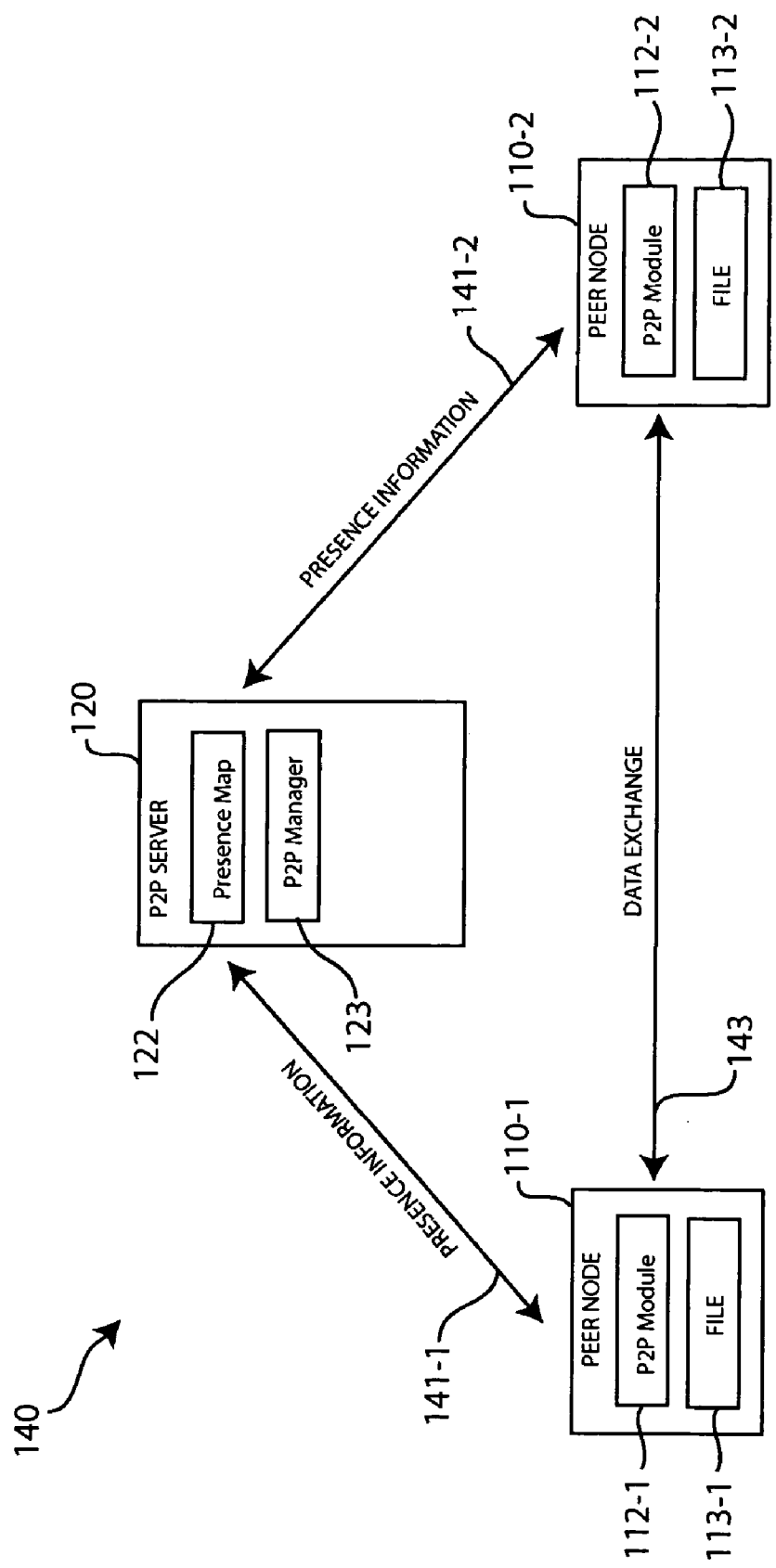
FIG. 1 shows a schematic diagram of a conventional peer-to-peer network.
Figure 3:
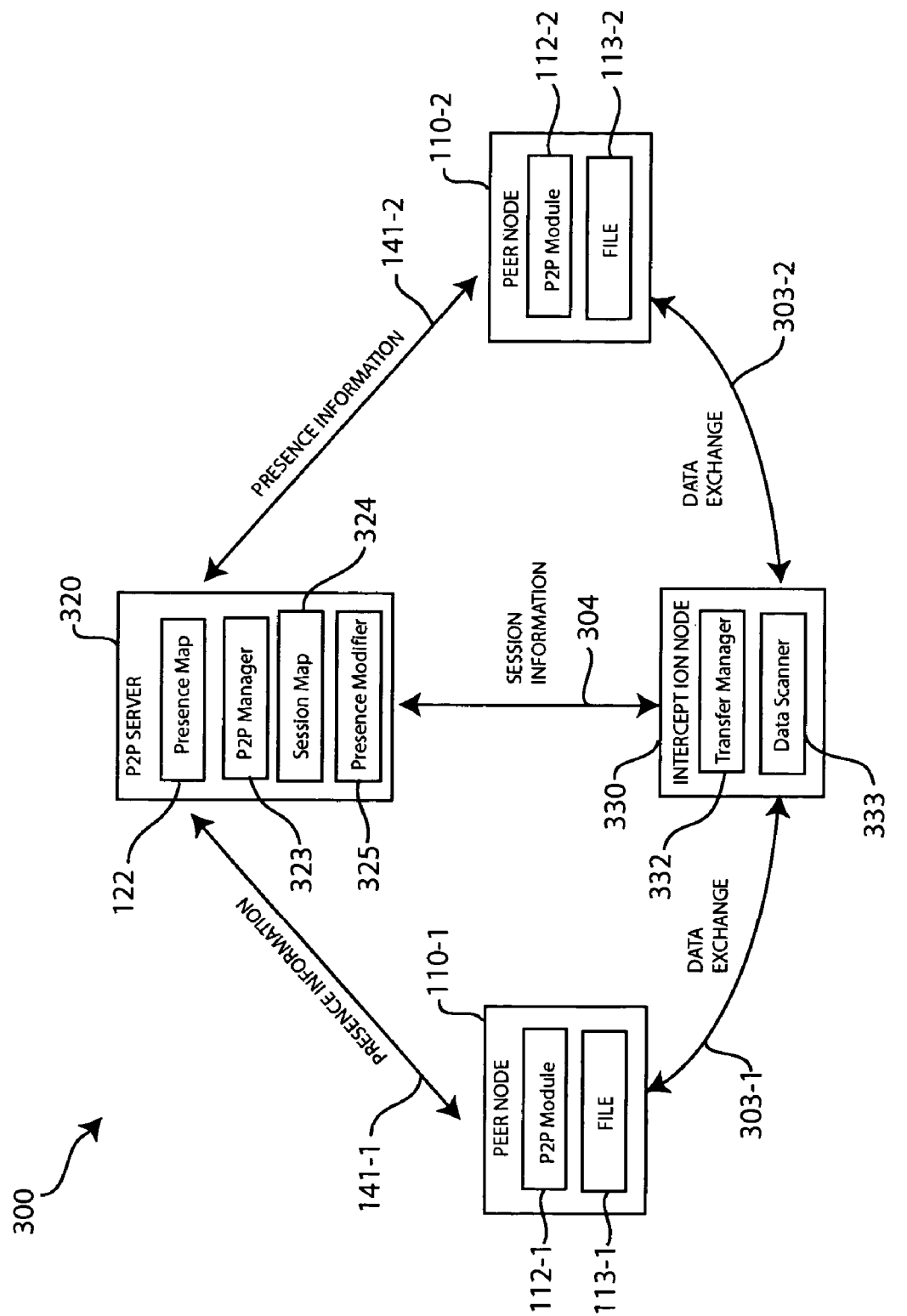
FIG. 3 shows a schematic diagram of a peer-to-peer network in accordance with an embodiment of the present invention.

FIG. 3 shows a schematic diagram of a P2P network 300 in accordance with an embodiment of the present invention. Similar to P2P network 140 (see FIG. 1), P2P network 300 includes a plurality of peer nodes 110, with each peer node 110 having a P2P module 112 and one or more files 113. Peer nodes 110 and their components have already been discussed in connection with FIG. 1. The components of a peer node 110 may vary from those disclosed herein without detracting from the merits of the present invention. P2P network 300 may also include a P2P server 320 and an interception node 330.

P2P server 320 may comprise a presence map 122, a P2P manager 323, a session map 324, and a presence modifier 325. As in P2P network 140, presence map 122 may be a table or data structure containing presence information of peer nodes 110 belonging to the P2P network. Presence information may include the location information of a peer node 110, such as its IP address and port number, for example. Table 1 shows a simplified content of an example presence map 122 for the example of FIG. 3. In the example shown in Table 1, peer nodes 110-1 and 110-2 (and other peer nodes not shown) have registered with P2P server 320. Peer nodes 110 provide their IP addresses to P2P server 320 as part of the registration process. Presence map 122 reflects the IP addresses of the registered peer nodes, among other information. The addresses shown in Table 1 have been simplified for clarity of illustration.

TABLE 1

| NODE | IP ADDRESS | Etc. |
|---|---|---|
| 110-1 | 1.1.1.1 | ... |
| 110-2 | 1.1.1.2 | ... |
| ... | ... | ... |

P2P manager 323 may comprise computer-readable program code for performing a registrar function and a proxy function. As a registrar, P2P manager 323 maintains presence map 122 and services registrations submitted by peer nodes 110. For example, peer node 110-1 may register with P2P server 320. As part of the registration process, peer node 110-1 may provide its IP address to P2P server 320. In P2P server 320, P2P manager 323 may accept the registration of peer node 110-1 and accordingly enter the IP address of peer node 110-1 in presence map 122. P2P manager 323 may also provide this registration service to other peer nodes 110 belonging to P2P network 300.

P2P manager 323 may proxy session information between peer nodes 110. The proxy function of P2P manager 323 allows peer nodes 110 to communicate through P2P server 320. For example, P2P manager 323 may forward an invitation for a data transfer or an acknowledgment to an invitation for a data transfer from one peer node 110 to another. As a further example, peer node 110-1 may send an invitation for a data transfer to peer node 110-2 by way of P2P server 320. In P2P server 320, P2P manager 323 may forward the invitation to peer node 110-2. Peer node 110-2 may agree to the invitation by sending an acknowledgment through P2P server 320. In P2P server 320, P2P manager 323 may forward the acknowledgment to peer node 110-1. In performing its proxy function, P2P manager 323 may consult presence map 122 to determine the location information of peer nodes 110.

In one embodiment, P2P manager 323 has provisions (e.g., application programming interface or API) for communicating with other program modules, such as presence modifier 325. This allows presence modifier 325 to communicate with P2P manager 323.

Presence modifier 325 may comprise computer-readable program code for redirecting data to an interception node 330, and for maintaining a session map 324. In one embodiment, presence modifier 325 modifies a location information published by a peer node 110 to that of an interception node 330. As will be more apparent below, this allows data that would otherwise be directly transferred between peer nodes 110 to be intercepted and processed in the interception node 330.

In the example of FIG. 3, P2P manager 323 and presence modifier 325 are both running in the same P2P server 320. As can be appreciated by those of ordinary skill in the art reading the present disclosure, a P2P manager and a presence modifier may also be running in separate computers. For example, a server computer running a presence modifier may be configured in front of a P2P server computer running a P2P manager. This way, communications between peer nodes and the P2P server computer may be intercepted and acted on by the presence modifier. Furthermore, in the example of FIG. 3, P2P manager 323 and presence modifier 325 are implemented as separate program modules in P2P server 320. It is to be noted that presence modifier 325 may also be integrated with P2P manager 323.

As shown in FIG. 3, P2P server 320 may also include a session map 324. Session map 324 may be a table or data structure containing information on communication sessions between peer nodes 110. Session map 324 may be accessed by presence modifier 325. Session map 324 may include the session ID of data transfers between peer nodes 110. This allows session map 324 to be consulted to determine the peer nodes involved in data transfer sessions in P2P network 300. For example, after peer nodes 110-1 and 110-2 have registered with P2P server 320, peer node 110-1 may send an invitation for data transfer to peer node 110-2 by way of P2P server 320. The data transfer may involve the transfer of file 113-1 from peer node 110-1 to peer node 110-2. Peer node 110-2 may accept the invitation, and accordingly send an acknowledgement to peer node 110-1 by way of P2P server 320. Peer node 110-1 responds to the acknowledgement by publishing its location information (e.g. IP: 1.1.1.1, Port: 5001) and a session ID (e.g. 123456789) to peer node 110-2 through P2P server 320. A session ID may be a unique identification employed for verification and tracking purposes. A session ID may be generated by a peer node 110 (peer node 110-1 in this example) using a GUID (global unique ID generator), for example. Other means for generating a session ID may also be employed without detracting from the merits of the present invention. In P2P server 320, presence modifier 325 enters the session ID and the location information of peer nodes 110-1 and 110-2 in session map 324. This allows session map 324 to note the data transfer between peer nodes 110-1 and 110-2. Table 2 shows simplified example contents of session map 324 for the data transfer between peer nodes 110-1 and 110-2. In the example shown in Table 2, the data transfer from peer node 110-1 to peer node 110-2 has a session ID of "123456789" in session map 324. Session ID "123456789" may be used as an index to determine the peer nodes involved in the data transfer. In this particular example, the location information for peer node 110-2 in session map 324 for session ID "123456789" does not require a port number because peer node 110-1 will be providing file 113-1. A port number may also be entered for each peer node in session map 324.

TABLE 2

| SESSION ID | Node Address/Port | Node Address/Port | Etc. |
|---|---|---|---|
| 123456789 | 1.1.1.1/5001 | 1.1.1.2 | ... |
| 678901234 | ... | ... | ... |
| ... | ... | ... | ... |

An interception node 330 may be a computer comprising a transfer manager 332 and a data scanner 333. Transfer manager 332 may comprise computer-readable program code for facilitating data transfer through interception node 330. In one embodiment, transfer manager 332 communicates with presence modifier 325 to obtain the session information (e.g., location information of the peer nodes involved in a data transfer) for a data transfer in P2P network 300. Transfer manager 332 may communicate with presence modifier 325 over a communication channel 304. For example, transfer manager 332 may request presence modifier 325 for the particulars of a session ID. Presence modifier 325 may use that session ID to obtain session information, such as the peer nodes involved in the data transfer, from session map 324 and provide that session information to transfer manager 332 over communication channel 304. It is to be noted that communication channels 141 (i.e., 141-1, 141-2), 303 (i.e., 303-1, 303-2) and 304 shown in FIG. 3 may be TCP/IP connections over the Internet, for example.

A data scanner 333 may comprise computer-readable program code for processing data in interception node 330. Data scanner 333 may be an antivirus program, for example. That is, data scanner 333 may scan data in interception node 330 for viruses. Data scanner 333 may also scan data in interception node 333 for content filtering purposes. For example, data scanner 333 may scan data for offensive words, confidential information and the like. It is to be noted that data scanner 333 may also process data in interception node 330 for purposes other than virus detection/removal and content filtering without detracting from the merits of the present invention.

Data intended to be transferred directly between two peer nodes 110 may be redirected to interception node 330, where the data may be processed by data scanner 333. Continuing the aforementioned example involving the transfer of file 113-1 from peer node 110-1 to peer node 110-2 and having a session ID of "123456789," presence modifier 325 may detect the location information published by peer node 110-1 and replace it with the location information of interception node 330. For example, presence modifier 325 may receive the location information from P2P manager 323 or intercept the location information before the location information is received by P2P manager 323 (such as when the presence modifier is configured in front of the P2P manager 325). Presence modifier 325 may then forward the location information of interception node 330 (e.g. IP: 1.1.1.3, Port: 3001) instead of peer node 110-1, to peer node 110-2. Peer node 110-2 may use the location information it received from presence modifier 325 to open a direct communication channel 303-2 with interception node 330. Peer node 110-2 provides interception node 330 the session ID ("123456789" in this example) of the data transfer. Note that peer node 110-2 "thinks" that it is having a P2P communication with peer node 110-1, not interception node 330. In other words, interception node 330 is advantageously transparent to peer node 110-2.

Still continuing with the example involving session ID "123456789," transfer manager 332 in interception node 330 may ask presence modifier 325 for the particulars of session ID "123456789." Presence modifier 325 may use the session ID to consult session map 324 and identify peer nodes 110-1 and 110-2 as the peer nodes involved in the data transfer. Presence modifier 325 may so inform transfer manager 332, which then opens a direct communication channel 303-1 to peer node 110-1 using the IP address and port number of peer node 110-1 as referenced in session map 324 under the session ID "123456789." Because interception node 330 received the session ID from peer node 110-2, transfer manager 332 may assume that a communication channel needs to be opened to the other peer node, which is peer node 110-1. Peer node 110-1 receives the session ID from interception node 330, verifies the session ID, and proceeds to transfer file 113-1 to interception node 330. Because of the session ID, peer node 110-1 thinks that it is having a P2P communication with peer node 110-2, not interception node 330. That is, interception node 330 is advantageously transparent to peer node 110-1. In interception node 330, data scanner 333 processes file 113-1. Thereafter, interception node 330 transfers file 113-1 to peer node 110-2, thereby completing the data transfer for that session ID. A similar procedure may be performed to transfer file 113-2 from peer node 110-2 to peer node 110-1.

Although embodiments of the present invention may be employed in a variety of applications, they are especially useful as an antivirus measure. The conventional approach in combating viruses in a P2P network is to perform virus scanning/removal in individual peer nodes. Unfortunately, this conventional approach has a serious flaw in that there may be a lot of peer nodes in a given P2P network and ensuring that each peer node has an up-to-date antivirus program (if at all) may be very difficult, if not impossible. Embodiments of the present invention advantageously allow for virus scanning/removal of data transferred over a P2P network in a manner that is relatively transparent to peer nodes and without having to perform antivirus processing in individual peer nodes.

Figure 4:
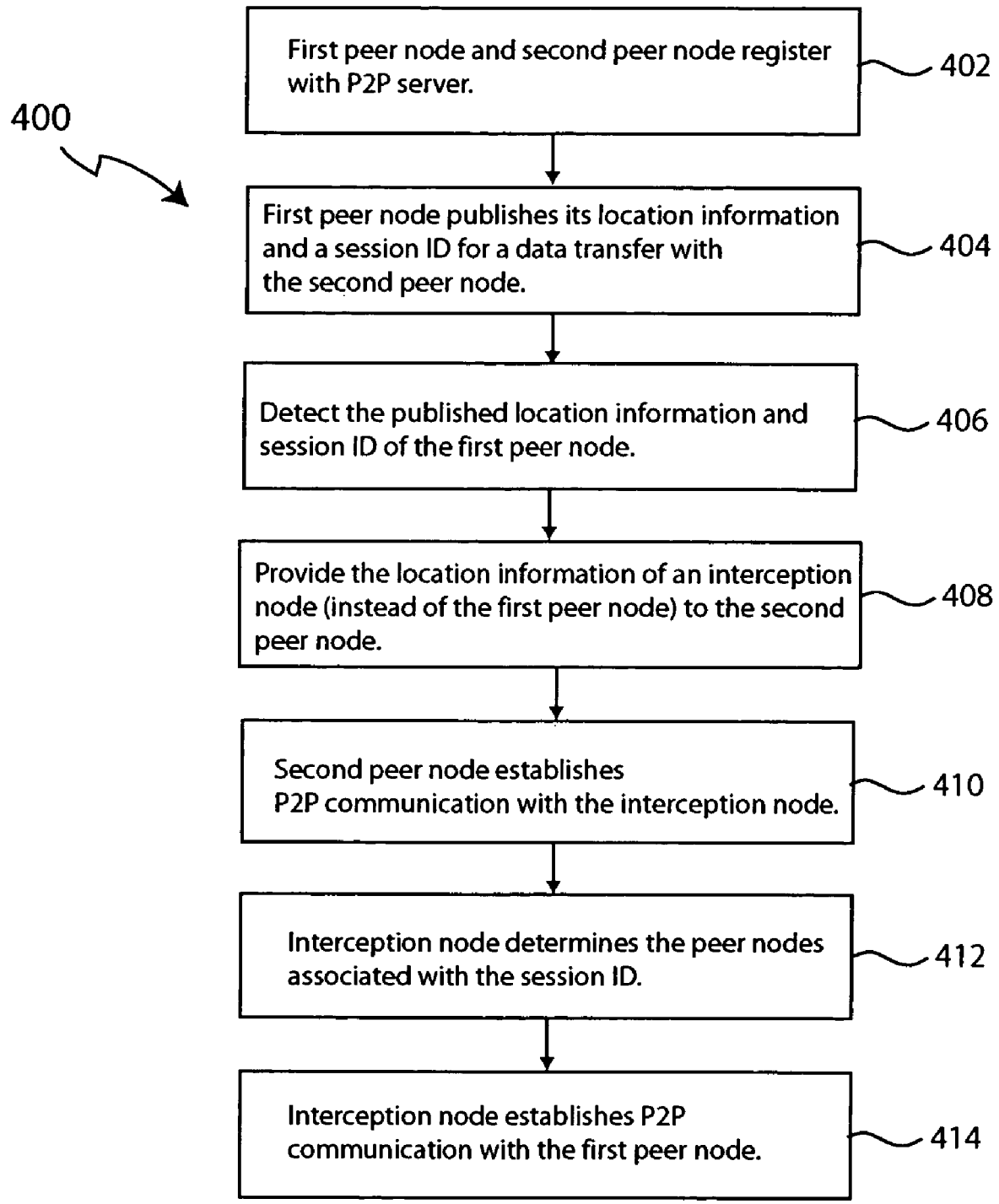
FIG. 4 shows a method of transferring data in a peer-to-peer network in accordance with an embodiment of the present invention.

Turning now to FIG. 4, there is shown a method 400 of transferring data in a peer-to-peer network in accordance with an embodiment of the present invention. Method 400 will be described with reference to the components shown in FIG. 3 for illustration purposes only. It is to be understood that method 400 may also be performed using other components without detracting from the merits of the present invention.

Beginning in step 402, a first peer node and a second peer node register with a P2P server. In the P2P server, a P2P manager enters the addresses (e.g., IP addresses) of the first and second peer nodes in a presence map.

In step 404, the first peer node publishes its location information (e.g., IP address and port number) and a session ID for a data transfer. Step 404 may be as a result of an invitation for a data transfer initiated by the first peer node and accepted by the second peer node. In that case, the published location information and session ID are addressed to the second peer node to allow the second peer node to establish a direct communication channel to the first peer node. The first peer node may be a data sender or receiver depending on the particulars of the data transfer. The data to be transferred may be a file, for example. The publication by the first peer node and the invitation/acknowledgement for data transfer may be transmitted through the P2P server using the P2P manager as a proxy.

In step 406, a presence modifier detects the published session ID and location information of the first peer node. The presence modifier may intercept the published session ID and location information to prevent them from being received by the P2P manager. Alternatively, the presence modifier may cooperatively work with the P2P manager in responding to any published session ID and location information. Other means for allowing the presence modifier to respond to the published session ID and location information may also be employed without detracting from the merits of the present invention. The presence modifier enters the session ID and location information of the first peer node and the second peer node in a session map.

In step 408, the presence modifier replaces the published location information of the first peer node with that of an interception node. The presence modifier then provides the session ID published by the first peer node and the location information (e.g., IP address, port number) of the interception node to the second peer node.

In step 410, the second peer node establishes a direct communication channel with the interception node using the location information of the interception node received from the presence modifier. The second peer node provides the session ID to the interception node.

In step 412, the interception node determines the peer nodes associated with the session ID. Because the interception node received the session ID from the second peer node, the interception node only needs to determine the location information of the other peer node involved in the data transfer. The interception node may perform step 412 by providing the session ID to the presence modifier. The presence modifier may use the session ID to search the session map for the particulars of the data transfer, such as the location information of the peer nodes involved in the data transfer. The presence modifier provides the particulars of the session ID to the interception node, which then determines that the first peer node is the intended communications partner of the second peer node.

In step 414, the interception node accordingly establishes a communication channel with the first peer node using the IP address and port number of the first peer node listed in the session map. The interception node provides the session ID to the first peer node. The first peer node verifies the session ID and proceeds to communicate with the interception node.

In method 400, data to be transferred between the first and second peer nodes are intercepted in the interception node. This allows the data to be processed in the interception node (e.g., for virus scanning). For example, in the case where the first peer node is to provide a file to the second peer node, the interception node may receive the file from the first peer node after step 414. The interception node may process the file before transferring the file to the second peer node. In another case where the first peer node is to receive a file from the second peer node, the interception node may receive the file from the second peer node after step 410. The interception node may process the file before transferring the file to the first peer node after the establishment of a communication channel with the first peer node in step 414. In light of the present disclosure, those of ordinary skill of the art will appreciate that the above-described redirection of data to an interception node in a data transfer between two peer nodes may be generally employed regardless of which peer node is the sender or receiver of the data.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of transferring a file in a peer-to-peer computer network, the method comprising:
   providing information to a first peer node that an interception node is a second peer node;
   redirecting the file from the first peer node to the interception node based on the provided information, the file originating from the first peer node and being originally intended to be transferred directly from the first peer node to the second peer node by peer-to-peer data transfer, the first peer node and the second peer node being computers in the peer-to-peer computer network;
   processing the file in the interception node, wherein the processing of the file in the interception node comprises scanning the file for viruses;
   querying a P2P server for location information of peer nodes involved in a transfer of the file;
   based on a response from the P2P server, identifying the second peer node as a node involved in the transfer of the file from the first peer node; and
   transferring the file from the interception node to the second peer node.

2. The method of claim 1 wherein the peer-to-peer computer network includes the Internet.

3. The method of claim 1 wherein processing the file in the interception node comprises filtering a content of the file.

4. The method of claim 1 wherein redirecting the file comprises:
   informing the second peer node that an address of the first peer node is that of the interception node.

5. A method of transferring a file from a first peer node to a second peer node in a peer-to-peer computer network, the method comprising:
   informing the second peer node that an address of the first peer node is that of an interception node;
   providing information to the first peer node that the interception node is the second peer node, the provided information comprising session ID for transfer of the file from the first peer node to the second peer node, the session ID being addressed by the first peer node to the second peer node to allow the second peer node to establish direct communication to the first peer node to receive the file;
   transferring the file from the first peer node to the interception node based on the provided information, the file originating from the first peer node and being originally intended to be transferred directly from the first peer node to the second peer node by peer-to-peer data transfer, the first peer node and the second peer node being computers in the peer-to-peer computer network;
   scanning the file for viruses in the interception node; and
   transferring the file from the interception node to the second peer node.

\* \* \* \* \*